(12) United States Patent
Breznova et al.

(10) Patent No.: US 7,852,615 B2
(45) Date of Patent: Dec. 14, 2010

(54) ELECTROLYTIC CAPACITOR ANODE TREATED WITH AN ORGANOMETALLIC COMPOUND

(75) Inventors: Hana Breznova, Vsetin (CZ); Martin Biler, Novy Jicin (CZ)

(73) Assignee: AVX Corporation, Myrtle Beach, SC (US)

( * ) Notice: Subject to any disclaimer, the term of this patent is extended or adjusted under 35 U.S.C. 154(b) by 430 days.

(21) Appl. No.: 12/017,463

(22) Filed: Jan. 22, 2008

(65) Prior Publication Data

US 2009/0185329 A1     Jul. 23, 2009

(51) Int. Cl.
*H01G 4/06* (2006.01)
*H01G 5/013* (2006.01)
*H01G 9/00* (2006.01)

(52) U.S. Cl. .................. 361/524; 29/25.03; 361/528
(58) Field of Classification Search ......... 361/528–529, 361/524; 29/25.03
See application file for complete search history.

(56) References Cited

U.S. PATENT DOCUMENTS

| | | | |
|---|---|---|---|
| 3,345,545 A | 10/1967 | Bourgault et al. | |
| 4,084,965 A | 4/1978 | Fry | |
| 4,085,435 A | 4/1978 | Galvagni | |
| 4,118,727 A | 10/1978 | Laplante | |
| 4,131,520 A | 12/1978 | Bernard et al. | |
| 4,149,876 A | 4/1979 | Rerat | |
| 4,155,017 A | 5/1979 | Gaule et al. | |
| 4,278,513 A | 7/1981 | Millard et al. | |
| 4,412,902 A | 11/1983 | Michikami et al. | |
| 4,672,267 A | 6/1987 | Lapatovich et al. | |
| 4,712,857 A | 12/1987 | Lee | |
| 4,722,756 A | 2/1988 | Hard | |
| 4,892,862 A | 1/1990 | Ogushi et al. | |
| 4,945,452 A | 7/1990 | Sturmer et al. | |
| 4,957,541 A | 9/1990 | Tripp et al. | |
| 5,098,485 A | 3/1992 | Evans | |
| 5,140,502 A * | 8/1992 | Kudoh et al. | ................. 361/540 |
| 5,198,187 A | 3/1993 | Lu et al. | |

(Continued)

FOREIGN PATENT DOCUMENTS

CN     1549286     11/2004

(Continued)

OTHER PUBLICATIONS

Abstract of Canadian Patent No. CA 2 018 346 dated Dec. 8, 1990.

(Continued)

*Primary Examiner*—Eric Thomas
(74) *Attorney, Agent, or Firm*—Dority & Manning, P.A.

(57) ABSTRACT

An electrolytic capacitor that contains an anodically oxidized anode that is incorporated with an additional metallic element is provided. More specifically, the metallic element is built into the valve metal pentoxide of the dielectric layer. In one particular embodiment, the addition of the metallic element results in a niobium pentoxide dielectric that contains closely packed units of O atoms, $Nb_6$ octahedral, and metal atoms ("A") that serve as counter cations. The use of relatively small electropositive metal atoms (A") helps fill the tetrahedral (e.g., Al, Si, Ti, Mg, or Mn), octahedral (e.g., Nb, V, Mg, or Mn) and trigonal bipyramid (e.g., V, Nb) interstices of the crystals. The stability of capacitor leakage current may be improved by variation in this crystal structure.

25 Claims, 6 Drawing Sheets

U.S. PATENT DOCUMENTS

| | | | |
|---|---|---|---|
| 5,198,968 A | 3/1993 | Galvagni |
| 5,306,479 A | 4/1994 | Sommers |
| 5,357,399 A | 10/1994 | Salisbury |
| 5,391,269 A | 2/1995 | Fiering et al. |
| 5,394,295 A | 2/1995 | Galvagni et al. |
| 5,457,862 A | 10/1995 | Sakata et al. |
| 5,473,503 A | 12/1995 | Sakata et al. |
| 5,495,386 A | 2/1996 | Kulkarni |
| 5,729,428 A | 3/1998 | Sakata et al. |
| 5,812,367 A | 9/1998 | Kudoh et al. |
| 5,949,639 A | 9/1999 | Maeda et al. |
| 5,993,513 A | 11/1999 | Fife |
| 6,051,044 A | 4/2000 | Fife |
| 6,072,694 A | 6/2000 | Hahn et al. |
| 6,115,235 A | 9/2000 | Naito |
| 6,165,623 A | 12/2000 | Fife et al. |
| 6,191,936 B1 | 2/2001 | Webber et al. |
| 6,197,252 B1 | 3/2001 | Bishop et al. |
| 6,312,642 B1 | 11/2001 | Fife |
| 6,322,912 B1 | 11/2001 | Fife |
| 6,334,945 B1 | 1/2002 | Lessner et al. |
| 6,338,816 B1 | 1/2002 | Fife |
| 6,373,685 B1 | 4/2002 | Kimmel et al. |
| 6,375,704 B1 | 4/2002 | Habecker et al. |
| 6,391,275 B1 | 5/2002 | Fife |
| 6,402,066 B1 | 6/2002 | Habecker et al. |
| 6,416,730 B1 | 7/2002 | Fife |
| 6,420,043 B1 | 7/2002 | Fife et al. |
| 6,455,443 B1 | 9/2002 | Eckert et al. |
| 6,462,934 B2 | 10/2002 | Kimmel et al. |
| 6,517,645 B2 | 2/2003 | Fife |
| 6,522,527 B2 | 2/2003 | Kojima et al. |
| 6,527,937 B2 | 3/2003 | Fife |
| 6,563,695 B1 | 5/2003 | Suzuki et al. |
| 6,576,099 B2 | 6/2003 | Kimmel et al. |
| 6,592,740 B2 | 7/2003 | Fife |
| 6,616,728 B2 | 9/2003 | Fife |
| 6,639,787 B2 | 10/2003 | Kimmel et al. |
| 6,674,635 B1 | 1/2004 | Fife et al. |
| 6,702,869 B2 | 3/2004 | Habecker et al. |
| 6,706,240 B2 | 3/2004 | Habecker et al. |
| 6,759,026 B2 | 7/2004 | Kimmel et al. |
| 6,821,314 B1 | 11/2004 | Reichert et al. |
| 6,835,225 B2 | 12/2004 | Naito et al. |
| 7,025,795 B2 | 4/2006 | Monden et al. |
| 7,116,548 B2 | 10/2006 | Satterfield, Jr. et al. |
| 7,149,074 B2 | 12/2006 | Kimmel et al. |
| 7,156,893 B2 | 1/2007 | Habecker et al. |
| 7,157,073 B2 | 1/2007 | Motchenbacher et al. |
| 7,218,505 B2 | 5/2007 | Naito et al. |
| 7,220,397 B2 | 5/2007 | Kimmel et al. |
| 7,241,436 B2 | 7/2007 | Fife |
| 7,262,511 B2 | 8/2007 | Osako et al. |
| 7,289,314 B2 | 10/2007 | Kobayashi et al. |
| 7,466,539 B2 | 12/2008 | Dementiev et al. |
| 7,471,503 B2 | 12/2008 | Bruner et al. |
| 2003/0104923 A1 | 6/2003 | Omori et al. |
| 2005/0013765 A1 | 1/2005 | Thomas et al. |
| 2005/0019581 A1 | 1/2005 | Schnitter |
| 2005/0103638 A1 | 5/2005 | Schnitter et al. |
| 2005/0150576 A1 | 7/2005 | Venigalla |
| 2005/0199321 A1 | 9/2005 | Spaniol |
| 2007/0072362 A1 | 3/2007 | Tseng et al. |
| 2007/0121276 A1 | 5/2007 | Uzawa et al. |
| 2007/0137434 A1 | 6/2007 | Omori et al. |
| 2008/0250620 A1 | 10/2008 | Qiu et al. |

FOREIGN PATENT DOCUMENTS

| | | |
|---|---|---|
| EP | 1591564 A2 | 11/2005 |
| GB | 237181 A | 8/2002 |
| JP | 62268121 A | 11/1987 |
| JP | 6151250 | 5/1994 |
| JP | 9306792 A | 11/1997 |
| SU | 1057995 A | 11/1983 |
| WO | WO 9738143 A1 | 10/1997 |
| WO | WO 9819811 A1 | 5/1998 |
| WO | WO 9838660 A1 | 9/1998 |
| WO | WO 0060620 A1 | 10/2000 |
| WO | WO 2005076297 A1 | 8/2005 |
| WO | WO 2006054795 A1 | 5/2006 |
| WO | WO 2007020458 A1 | 2/2007 |
| WO | WO 2007020464 A1 | 2/2007 |
| WO | WO 2007026165 A1 | 3/2007 |

OTHER PUBLICATIONS

Abstract of Japanese Patent No. JP1176226 dated Jul. 12, 1989.
Abstract of Japanese Patent No. JP2038501 dated Feb. 7, 1990.
Abstract of Japanese Patent No. JP3023222 dated Jan. 31, 1991.
Abstract of Japanese Patent No. JP4070594 dated Mar. 5, 1992.
*Adsorption of Gases in Multimolecular Layers*, Brunauer et al., The Journal of the American Chemical Society, vol. 60, Feb. 1938, pp. 309-319.
*Change in Porous Structure and Leakage Currents of Niobium Capacitor Anodes During Electrolytic Oxidation*, Levinskiy, et al., Poroshkovaya Metallurgiya, No. e, 1991, pp. 56-59.
*Charge Carrier Transport and Storage in NbO Capacitors*, Sikula et al., CARTS Europe, Oct. 21, 2004, 4 pages.
*Conductivity Mechanisms and Breakdown Characteristics of Niobium Oxide Capacitors*, Hlavka et al., AVX Corporation 2003, 5 pages.
*Conductivity Mechanisms and Breakdown of NbO Capacitors*, Hlavka et al., CARTS USA, Mar. 19, 2004, 7 pages.
*Dynamic Phenomena in Superconducting Oxides Measured by ESR*, Acrivos et al., Physical Review B, vol. 50, No. 18, Nov. 1, 1994, pp. 13.710-13.723.
*Dynamics of Flux Motion Observed by ESR in Superconducting Oxides*, Acrivos et al., Physics C 235-240, 1994, pp. 3159-3160.
*Electrical Conductivity in Ceramics and Glass*, Vest et al., Department of the Air Force, Aerospace Research Laboratories, Wright-Patterson Air Force Base, OH., 1974, pp. 375-384.
*Electrochemical characterization of a polypyrrole/$Co_{0.2}CrO_x$ composite as a cathode material for lithium ion batteries*, Ramasamy et al., Journal of Power sources 124, 2003, pp. 197-203.
*Electrolytic Capacitors*, Electrochemical Society Reviews and News, vol. 24, No. 12, Dec. 1977, pp. 408C-409-C.
Encyclopedia of Chemical Technology entitled *Nickel and Nickel Alloys to Paint*, vol. 17, 4th Edition, pp. 59 and 65-66.
*Extended Range NbO Capacitors Through Technology and Materials Enhancements*, Zednicek, et al., CARTS USA, Mar. 24, 2005, 5 pages.
*General Characteristics of the Film-Forming Metals: the Relation Between Overpotential and the Fields in the Oxide and Across the Interfaces*, Young, Chapter 2, pp. 4-5.
*Growth of thin-film niobium oxide layers by molecular-beam epitaxy*, Petrucci et al., J. Appl. Phys. 63(3), Feb. 1, 1988, pp. 900-909.
*Heat Field Stability and Crystallization Peculiarities of Amorphous $Nb_2O_5$ Films*, Palatnik et al., Fizika I Khimiya Obrabotki Materialov, No. 5, 1982, pp. 87-94.
*High-Capacitance Supercapacitor Using a Nanocomposite Electrode of Single-Walled Carbon Nanotube and Polypyrrole*, An et al., Journal of the Electrochemical Society, vol. 149, No. 8, 2002, pp. A1058-A1062.
*Investigation of Columbium as an Electrolytic Capacitor Anode, Part II*, Peabody, U.S. Army Signal Research and Development Laboratory, Fort Monmouth, NJ, DA Task Nr. 3a99-15-003-04, 1962, pp. 1-11.
*Low ESR and Low Profile Technology on Niobium Oxide*, Zednicek et al., AVX Corporation 2003, 9 pages.
*Mechanism of leakage current reduction of tantalum oxide capacitors by titanium doping*, Lau et al., Applied Physics Letters 90, 2007, pp. 112903-1-112903-3.

*NbO Capacitor Parameters Improvement, Leakage Current Mechanism and Anodic Oxidation*, Šikula et al., Mar. 30, 2005, 7 pages.
*New Tantalum Technologies, Tantalum Polymer, and Niobium Oxide Capacitors*, T. Zedníček, CARTS Europe Prague, Oct. 19, 2005, 7 pages.
*Niobium Compounds and Alloys*, J. Eckert, Int. J. Of Refractory Metals & Hard Materials, vol. 12, 1993-1994, pp. 335-340.
*Niobium Oxide and Tantalum Capacitors: M-I-S Model Parameters Comparison*, Sikula et al., Carts Usa, Mar. 24, 2005, 4 pages.
*Niobium Oxide set to beat the pants off tants*, CIE (Components in Electronics), Aug. 2007.
*Niobium Oxide Technology Roadmap*, Zednicek et al., AVX Corporation, T. Zednicek et al., CARTS Europe Nice, Oct. 15, 2002, 5 pages.
*Niobium Physico-Chemical Properties of Its Compounds and Alloys*, Feschotte et al., International Atomic Energy Review, Special Issue No. 2, 1968, pp. 56-59.
*Niobium Solid Electrolytic Capacitors*, Schwartz et al., Journal of the Electrochemical Society, vol. 108, No. 8, Aug. 1961, pp. 750-757.
*Note on the Crystal Structure of Niobium Dioxide*, Magneli et al., Acta Chem. Scand. 9, No. 8, 1955.
*Oxidative coupling of methane over NbO (p-type) and $Nb_2O_5$ (n-type) semiconductor materials*, Erarslanoglu et al., Catalysis Letters 38, 1996, pp. 215-218.
*Phosphoric Acid Passivated Niobium and Tantalum EIS-Comparative Study*, Al-Kharafi et al., Electrochimica Acta, vol. 40, No. 16, 1995, pp. 2623-2626.
*Preparation and Chlorination of $NbO_2$ and NbO and NbC*, Baba et al., Journal of Mining and Metallurgical Inst. of Japan, vol. 82, No. 942, 1966, pp. 855-860.
*Quality of Niobium Oxide Semiconductor Capacitors as a Function of Chemical Composition of the Niobium Powder*, Bord et al., No. 1 (46), 1982, pp. 11-15.
*Study of NbO by neutron diffraction of inelastic scattering of neutrons*, V. V. Sumin, Soy. Phys. Crystallogr. 34(3), May-Jun. 1989, pp. 391-393.
*Study of Oxygen Solubility in Niobium*, Orlov et al., Izvestiya Akademii Nauk SSSR, Metally, No. 5, 1985, pp. 202-205.
*Superconductivity in the System Ln-Sr-Nb-O (Ln = La, Nd, Gd, Dy, Tm, Lu)*, Kuz'micheva et al., Russian Journal of Inorganic Chemistry, vol. 38, No. 1, 1993, pp. 149-153.
*The crystal structure of niobium monoxide*, Bowman et al., Los Alamos Scientific Laboratory, University of California, Los Alamos, NM, Jun. 4, 1966.
*The Formation of the Lower Oxides of Niobium and Tantalum in Some Reactions of Reduction and Oxidation*, Lapitskii et al., Zhurnal Neorganischeskoi Khimii (Journal of Inorganic Chemistry, USSR), vol. II, No. 1, 1957, pp. 80-91.
*The Influence of Gas Atmospheres on the First Stage Sintering of High Purity Niobium Powders*, Krehl et al., Metallurgical Transactions, vol. 15A, Jun. 1984, pp. 1111-1116.
*The Microstructure of Slightly Substoichiometric $NbO_1$*, Gannon et al, Journal of Solid State Chemistry, vol. 20, 1977, pp. 331-344.
*The Oxides of Niobium*, Georg Bauer, Zeitschrift fuer anorganische and allgemeine Chemie, vol. 248, No. 1, Sep. 12, 1941, pp. 1-31.
*The Stabilization of Niobium-Based Solid Electrolyte Capacitors*, Qiu et al., Active and Passive Elec. Comp., vol. 25, 2002, pp. 201-209.
*The Use of Niobium as an Anode Material in Liquid Filled Electrolytic Capacitors*, Jackson et al., Electrocomponent Science and Technology, vol. 1, 1974, pp. 27-37.
*Transport and Noise Characteristics of Niobium Oxide and Tantalum Capacitors*, Sikula et al., 4 pages.
Catalog—Alfa Æsar—The Right Chemicals/The Right Chemistry, 1995-1996, 1 page.
Chapter entitled *The Lower Oxides of Columbium* by Mellor from A Comprehensive Treatise on Inorganic and Theoretical Chemistry, vol. IX, 1923, pp. 856-857.
Chemical Structure of gamma-Glycidoxypropyltrimethoxysilane from Si Power Chemical Corporation—SiSiB® Silane Coupling Agent, SiSiB® PC3100.
Material Safety Data Sheet for Niobium Oxide, Jun. 1994, ESPI Metals.
Technical Report—*Niobium Solid Electrolytic Capacitors*, Mifune et al., National Technical Report 9, 1963, 17 pages.
Translation of SU 1,556,420 entitled *Material for Anodes of Electrolytic and Oxide-Semiconductor Capacitors*, by Yelyutin et al., Jul. 28, 1987.
Z. anorg. Allg. Chemie, vol. 317, 1962, pp. 321-333.
UK Search Report for GB0821008.0 dated Mar. 18, 2009, 4 pages.

\* cited by examiner

ELECTROLYTIC CAPACITOR ANODE TREATED WITH AN ORGANOMETALLIC COMPOUND

BACKGROUND OF THE INVENTION

Electrolytic capacitors are often formed from valve action materials that are capable of being oxidized to form a dielectric layer. Typical valve action metals are niobium and tantalum. More recently, capacitors have been developed that employ an anode made from an electrically conductive oxide of niobium and a niobium pentoxide dielectric. Niobium oxide has a unique structure as the coordination of both Nb and O atoms appears to be square planar. The arrangement of atoms is that of a defect rock salt structure in which all the atoms at the center and vertices of the unit cells are removed. It has been shown that the formation of the ordered defect structure augments Nb—Nb bonding and stabilizes the square planar oxygen atom by Nb—O π-bonding. Thus, the compound is actually an aggregate of $Nb_6O_{12}$ clusters. By the anodic oxidation in appropriate voltage, NbO is oxidized to $Nb_2O_5 nH_2O$. Upon heating, the hydrated niobium pentoxide slowly loses water; then, the $Nb_2O_5$ goes through a series of structural changes and loses a certain amount of oxygen with the formation of oxygen-deficient nonstoichiometric niobium oxide. Unfortunately, this can lead to leakage current instability at accelerated temperature and voltage load.

As such, a need currently exists for an electrolytic capacitor having low leakage current with a corresponding high volumetric efficiency.

SUMMARY OF THE INVENTION

In accordance with one embodiment of the present invention, a method for forming a capacitor anode is disclosed that comprises forming an anode body that comprises a valve metal composition and anodically oxidizing the anode body in the presence of an electrolyte to form a dielectric layer. The electrolyte comprises an organometallic compound in an amount of from about 0.1 wt. % to about 20 wt. %. In accordance with another embodiment of the present invention, an electrolytic capacitor is disclosed that comprises an anode body containing tantalum, niobium, or an electrically conductive oxide thereof; a dielectric layer overlying the anode body; and an electrolyte layer overlying the dielectric layer. The dielectric layer contains a metallic element that includes silicon.

Other features and aspects of the present invention are set forth in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures in which.

Figure 1:
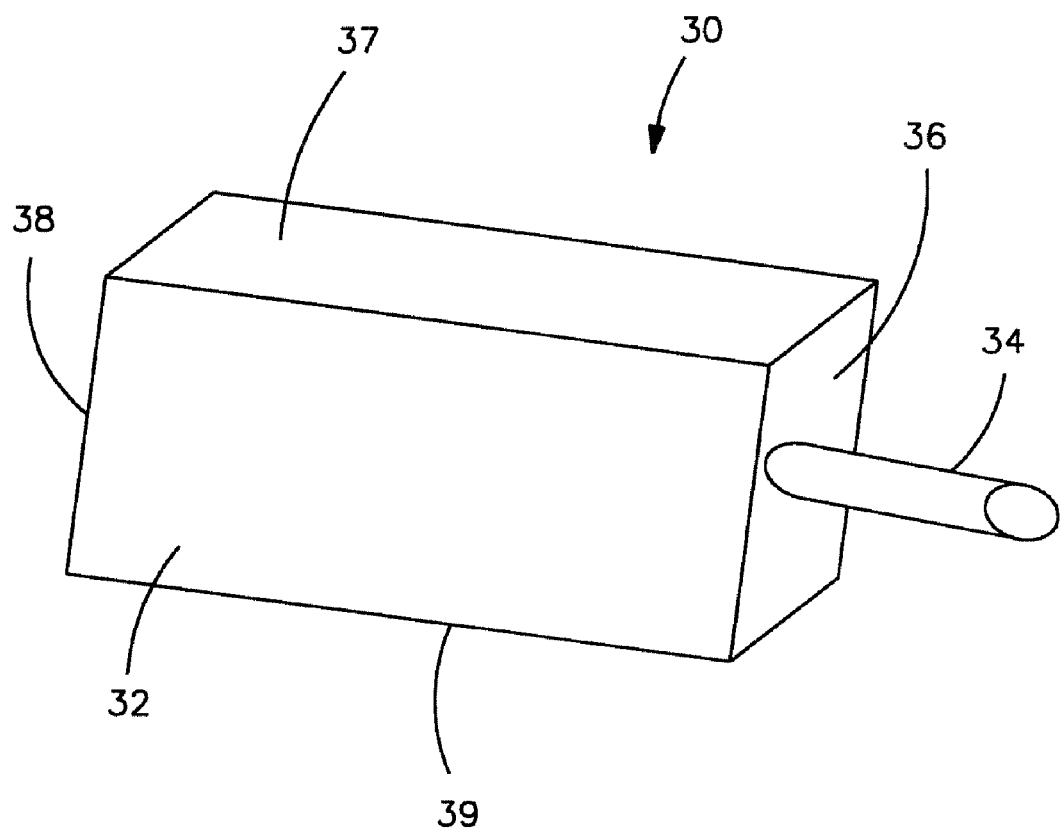
FIG. 1 is a perspective view of one embodiment of an electrolytic capacitor of the present invention.

Repeat use of references characters in the present specification and drawings is intended to represent same or analogous features or elements of the invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Generally speaking, the present invention is directed to an electrolytic capacitor that contains an anodically oxidized anode that is incorporated with an additional metallic element. More specifically, the metallic element is built into the valve metal pentoxide of the dielectric layer. In one particular embodiment, the addition of the metallic element results in a niobium pentoxide dielectric that contains closely packed units of O atoms, $Nb_6$ octahedral, and metal atoms ("A") that serve as counter cations. The use of relatively small electropositive metal atoms (A") helps fill the tetrahedral (e.g., Al, Si, Ti, Mg, or Mn), octahedral (e.g., Nb, V, Mg, or Mn) and trigonal bipyramid (e.g., V, Nb) interstices of the crystals. The stability of capacitor leakage current may be improved by variation in this crystal structure.

To incorporate the metallic element into the dielectric layer, the anode is treated with an organometallic compound during anodic oxidation. Without intending to be limited by theory, it is believed that organometallic compounds may undergo solvatolysis, after which the metallic element is built into the structure of the dielectric. Any suitable organometallic compound may be used in the present invention. The organometallic compound typically contains an organic chain with at least one reactive functional group bonded to a metal atom, such as silicon, titanium, aluminum, vanadium, niobium, manganese, magnesium, and so forth. Examples of suitable organometallic compounds may include, for instance, organosilanes, such as alkoxysilanes (e.g., vinyltrimethoxysilane, vinyltriethoxysilane, vinylmethyldimethoxysilane, vinylmethyldiethoxysilane, 3-aminopropyltrimethoxysilane, 3-aminopropyltriethoxysilane, 3-aminopropylmethyldimethoxysilane, 3-aminopropylmethyidiethoxysilane, 3-(2-aminoethyl)aminopropyltrimethoxysilane, 3-mercaptopropyltrimethoxysilane, 3-mercaptopropyltriethoxysilane, 3-mercaptopropylmethyldimethoxysilane, 3-mercaptopropylmethyidiethoxysilane, glycidoxymethyltrimethoxysilane, glycidoxymethyltriethoxysilane, glycidoxymethyltripropoxysilane, glycidoxymethyltributoxysilane, β-glycidoxyethyltrimethoxysilane, β-glycidoxyethyltriethoxysilane, β-glycidoxyethyl-tripropoxysilane, β-glycidoxyethyl-tributoxysilane, β-glycidoxyethyltrimethoxysilane, α-glycidoxyethyltriethoxysilane, α-glycidoxyethyltripropoxysilane, α-glycidoxyethyltributoxysilane, γ-glycidoxypropyl-trimethoxysilane, γ-glycidoxypropyltriethoxysilane, γ-glycidoxypropyl-tripropoxysilane, γ-glycidoxypropyltributoxysilane, β-glycidoxypropyltrimethoxysilane, β-glycidoxypropyl-triethoxysilane, β-glycidoxypropyltripropoxysilane, α-glycidoxypropyltributoxysilane, α-glycidoxypropyltrimethoxysilane, α-glycidoxypropyltriethoxysilane, α-glycidoxypropyltripropoxysilane, α-glycidoxypropyltributoxysilane, γ-glycidoxybutyltrimethoxysilane, δ-glycidoxybutyltriethoxysilane, δ-glycidoxybutyltripropoxysilane, δ-glycidoxybutyltributoxysilane, δ-glycidoxybutyltrimethoxysilane, γ-glycidoxybutyltriethoxysilane, γ-glycidoxybutyltripropoxysilane, γ-propoxybutyltributoxysilane, δ-glycidoxybutyl-trimethoxysilane, δ-glycidoxybutyltriethoxysilane, δ-glycidoxybutyltripropoxysilane, α-glycidoxybutyltrimethoxysilane, α-glycidoxybutyltriethoxysilane, α-glycidoxybutyl-tripropoxysilane, α-glycidoxybutyltributoxysilane, (3,4-epoxycyclohexyl)-methyl-trimethoxysilane, (3,4-epoxycyclohexyl)methyl-triethoxysilane, (3,4-epoxycyclohexyl)methyltripropoxysilane, (3,4-epoxycyclohexyl)-methyl-tributoxysilane, (3,4-epoxycyclohexyl)ethyl-trimethoxysilane, (3,4-epoxycyclohexyl)ethyl-triethoxysilane, (3,4-epoxycyclohexyl)ethyltripropoxysilane, (3,4-epoxycyclohexyl)ethyltributoxysilane, (3,4-epoxycyclohexyl)propyltrimethoxysilane, (3,4-epoxycyclohexyl)propyltriethoxysilane, (3,4-epoxycyclohexyl)propyl-tripropoxysilane, (3,4-epoxycyclohexyl)propyltributoxysilane, (3,4-epoxycyclohexyl)butyltrimethoxysilane, (3,4-epoxycyclohexy) butyltriethoxysilane, (3,4-epoxycyclohexyl)butyltripropoxysilane, (3,4-epoxycyclohexyl)butyltributoxysilane, etc.) and alkylsilanes (e.g., vinyltrichlorosilane, vinylmethyidichlorosilane, etc.); organotitanates, such as bis(cyclopentadienyl)titanium bis (trifluoromethanesulfonate), chlorotriisopropoxytitanium, diisopropoxytitanium bis(acetylacetonate), 3-hydroxy-1,2-propanedioxytitanium dichloride, tetrakis(diethylamido)titanium, titanium bis(ammonium lactato)dihydroxide, titanium butoxide, titanium isopropoxide, isopropyl triisostearoyl titanate, isopropyl tris(dioctyl pyrophosphite) titanate, isopropyl tri(N-aminoethylaminoethyl)titanate, isopropyl tridecyl benzene sulfonyl titanate, tetraoctyl bis(d itridecyl phosphite)titanate, tetra(2,2-diaryloxymethyl-1-butyl)-bis(ditridecyl)phosphite titanate, bis(dioctyl pyrophosphate) oxyacetate titanate, bis(dioctyl pyrophosphate)ethylene titanate, isopropyl trioctanoyl titanate, isopropyl dimethacryl isostearoyl titanate, isopropyl tricumyl phenyl titanate, etc.); organoaluminum, such as aluminum acetylacetonate, aluminum butoxide, aluminum isopropoxide, aluminum monostearate, acetal alkoxy aluminum diisopropylate; and so forth.

The anode may be formed using any technique known in the art. In one embodiment, for example, the anode is formed from a valve metal composition. The valve metal composition may have a specific charge of about 25,000 μF*V/g or more, in some embodiments about 40,000 μF*V/g or more, in some embodiments about 60,000 μF*V/g or more, and in some embodiments, from about 80,000 to about 200,000 μF*V/g or more. The valve metal composition contains a valve metal (i.e., metal that is capable of oxidation) or valve metal-based compound, such as tantalum, niobium, aluminum, hafnium, titanium, alloys thereof, oxides thereof, nitrides thereof, and so forth. For example, the valve metal composition may contain an electrically conductive oxide of niobium, such as niobium oxide having an atomic ratio of niobium to oxygen of 1:1.0±1.0, in some embodiments 1:1.0±0.3, in some embodiments 1:1.0±0.1, and in some embodiments, 1:1.0±0.05. For example, the niobium oxide may be $NbO_{0.7}$, $NbO_{1.0}$, $NbO_{1.1}$, and $NbO_2$. In a preferred embodiment, the composition contains $NbO_{1.0}$, which is a conductive niobium oxide that may remain chemically stable even after sintering at high temperatures. Examples of such valve metal oxides are described in U.S. Pat. No. 6,322,912 to Fife; U.S. Pat. No. 6,391,275 to Fife et al.; U.S. Pat. No. 6,416,730 to Fife et al.; U.S. Pat. No. 6,527,937 to Fife; U.S. Pat. No. 6,576,099 to Kimmel, et al.; U.S. Pat. No. 6,592,740 to Fife et al and U.S. Pat. No. 6,639,787 to Kimmel, et al.; and U.S. Pat. No. 7,220,397 to Kimmel, al., as well as U.S. Patent Application Publication Nos. 2005/0019581 to Schnitter; 2005/0103638 to Schnitter, et al.; 2005/0013765 to Thomas, et al., all of which are incorporated herein in their entirety by reference thereto for all purposes.

The valve metal composition may be in the form of particles possessing any desired shape or size. For example, the particles may be flaked, angular, nodular, and mixtures or variations thereof. The particles also typically have a screen size distribution of at least about 60 mesh, in some embodiments from about 60 to about 325 mesh, and in some embodiments, from about 100 to about 200 mesh. Further, the specific surface area is from about 0.1 to about 10.0 m$^2$/g, in some embodiments from about 0.5 to about 5.0 m$^2$/g, and in some embodiments, from about 1.0 to about 2.0 m$^2$/g. The term "specific surface area" refers to the surface area determined by the physical gas adsorption (B.E.T.) method of Bruanauer, Emmet, and Teller, Journal of American Chemical Society, Vol. 60, 1938, p. 309, with nitrogen as the adsorption gas. Likewise, the bulk (or Scott) density is typically from about 0.1 to about 5.0 g/cm$^3$, in some embodiments from about 0.2 to about 2.5 g/cm$^3$, and in some embodiments, from about 0.5 to about 1.5 g/cm$^3$.

To facilitate formation of the anode, other components may be added to the electrically conductive particles. For example, the electrically conductive particles may be optionally mixed with a binder and/or lubricant to ensure that the particles adequately adhere to each other when pressed to form the anode body. Suitable binders may include camphor, stearic and other soapy fatty acids, Carbowax (Union Carbide), Glyptal (General Electric), polyvinyl alcohols, napthaline, vegetable wax, and microwaxes (purified paraffins). The binder may be dissolved and dispersed in a solvent. Exemplary solvents may include water, alcohols, and so forth. When utilized, the percentage of binders and/or lubricants may vary from about 0.1% to about 8% by weight of the total mass. It should be understood, however, that binders and lubricants are not required in the present invention.

Once formed, the resulting powder may be compacted using any conventional powder press mold. For example, the press mold may be a single station compaction press using a die and one or multiple punches. Alternatively, anvil-type compaction press molds may be used that use only a die and single lower punch. Single station compaction press molds are available in several basic types, such as cam, toggle/knuckle and eccentric/crank presses with varying capabilities, such as single action, double action, floating die, movable platen, opposed ram, screw, impact, hot pressing, coining or sizing. The powder may be compacted around an anode wire (e.g., tantalum wire). It should be further appreciated that the anode wire may alternatively be attached (e.g., welded) to the anode body subsequent to pressing and/or sintering of the anode body. After compression, any binder/lubricant may be removed by heating the pellet under vacuum at a certain temperature (e.g., from about 150° C. to about 500° C.) for several minutes. Alternatively, the binder/lubricant may also be removed by contacting the pellet with an aqueous solution, such as described in U.S. Pat. No. 6,197,252 to Bishop, et al., which is incorporated herein in its entirety by reference thereto for all purposes. Thereafter, the pellet is sintered to form a porous, integral mass. For example, in one embodiment, the pellet may be sintered at a temperature of from about 1200° C. to about 2000° C., and in some embodiments, from about 1500° C. to about 1800° C. under vacuum. Upon sintering, the pellet shrinks due to the growth of bonds between the particles. In addition to the techniques described above, any other technique for forming the anode body may also be utilized in accordance with the present invention, such as described in U.S. Pat. No. 4,085,435 to Galvagni; U.S. Pat. No. 4,945,452 to Sturmer, et al.; U.S. Pat. No. 5,198,968 to Galvagni; U.S. Pat. No. 5,357,399 to Salisbury; U.S. Pat. No. 5,394,295 to Galvagni, et al.; U.S. Pat. No. 5,495,386 to Kulkarni; and U.S. Pat. No. 6,322,912 to Fife, which are incorporated herein in their entirety by reference thereto for all purposes.

Although not required, the thickness of the anode may be selected to improve the electrical performance of the capacitor. For example, the thickness of the anode may be about 4 millimeters or less, in some embodiments, from about 0.2 to about 3 millimeters, and in some embodiments, from about 0.4 to about 1 millimeter. The shape of the anode may also be selected to improve the electrical properties of the resulting capacitor. For example, the anode may have a shape that is curved, sinusoidal, rectangular, U-shaped, V-shaped, etc. The anode may also have a "fluted" shape in that it contains one or more furrows, grooves, depressions, or indentations to increase the surface to volume ratio to minimize ESR and extend the frequency response of the capacitance. Such "fluted" anodes are described, for instance, in U.S. Pat. No. 6,191,936 to Webber, et al.; U.S. Pat. No. 5,949,639 to Maeda, et al.; and U.S. Pat. No. 3,345,545 to Bourgault et al., as well as U.S. Patent Application Publication No. 2005/0270725 to Hahn, et al., all of which are incorporated herein in their entirety by reference thereto for all purposes.

Once formed, the anode may be anodized so that a dielectric layer is formed over and/or within the anode. Anodization is an electrochemical process by which the anode is oxidized to form a material having a relatively high dielectric constant. For example, a niobium oxide (NbO) anode may be anodized to niobium pentoxide ($Nb_2O_5$). Typically, anodization is performed by initially applying an electrolyte to the anode, such as by dipping anode into the electrolyte. The electrolyte is generally in the form of a liquid, such as a solution (e.g., aqueous or non-aqueous), dispersion, melt, etc. A solvent is generally employed in the electrolyte, such as water (e.g., deionized water); ethers (e.g., diethyl ether and tetrahydrofuran); alcohols (e.g., methanol, ethanol, n-propanol, isopropanol, and butanol); triglycerides; ketones (e.g., acetone, methyl ethyl ketone, and methyl isobutyl ketone); esters (e.g., ethyl acetate, butyl acetate, diethylene glycol ether acetate, and methoxypropyl acetate); amides (e.g., dimethylformamide, dimethylacetamide, dimethylcaprylic/capric fatty acid amide and N-alkylpyrrolidones); nitriles (e.g., acetonitrile, propionitrile, butyronitrile and benzonitrile); sulfoxides or sulfones (e.g., dimethyl sulfoxide (DMSO) and sulfolane); and so forth. The solvent may constitute from about 50 wt. % to about 99.9 wt. %, in some embodiments from about 75 wt. % to about 99 wt. %, and in some embodiments, from about 80 wt. % to about 95 wt. % of the electrolyte. Although not necessarily required, the use of an aqueous solvent (e.g., water) is often desired to facilitate formation of an oxide. In fact, water may constitute about 1 wt. % or more, in some embodiments about 10 wt. % or more, in some embodiments about 50 wt. % or more, in some embodiments about 70 wt. % or more, and in some embodiments, about 90 wt. % to 100 wt. % of the solvent(s) used in the electrolyte.

The electrolyte is electrically conductive and may have an electrical conductivity of about 1 milliSiemens per centimeter ("mS/cm") or more, in some embodiments about 30 mS/cm or more, and in some embodiments, from about 40 mS/cm to about 100 mS/cm, determined at a temperature of 25° C. To enhance the electrical conductivity of the electrolyte, a compound may be employed that is capable of dissociating in the solvent to form ions. Suitable ionic compounds for this purpose may include, for instance, acids, such as hydrochloric acid, nitric acid, sulfuric acid, phosphoric acid, polyphosphoric acid, boric acid, boronic acid, etc.; organic acids, including carboxylic acids, such as acrylic acid, methacrylic acid, malonic acid, succinic acid, salicylic acid, sulfosalicylic acid, adipic acid, maleic acid, malic acid, oleic acid, gallic acid, tartaric acid, citric acid, formic acid, acetic acid, glycolic acid, oxalic acid, propionic acid, phthalic acid, isophthalic acid, glutaric acid, gluconic acid, lactic acid, aspartic acid, glutaminic acid, itaconic acid, trifluoroacetic acid, barbituric acid, cinnamic acid, benzoic acid, 4-hydroxybenzoic acid, aminobenzoic acid, etc.; sulfonic acids, such as methanesulfonic acid, benzenesulfonic acid, toluenesulfonic acid, trifluoromethanesulfonic acid, styrenesulfonic acid, naphthalene disulfonic acid, hydroxybenzenesulfonic acid, dodecylsulfonic acid, dodecylbenzenesulfonic acid, etc.; polymeric acids, such as poly(acrylic) or poly(methacrylic) acid and copolymers thereof (e.g., maleic-acrylic, sulfonic-acrylic, and styrene-acrylic copolymers), carageenic acid, carboxymethyl cellulose, alginic acid, etc.; and so forth. The concentration of ionic compounds is selected to achieve the desired electrical conductivity. For example, an acid (e.g., phosphoric acid) may constitute from about 0.01 wt. % to about 5 wt. %, in some embodiments from about 0.05 wt. % to about 0.8 wt. %, and in some embodiments, from about 0.1 wt. % to about 0.5 wt. % of the electrolyte. If desired, blends of ionic compounds may also be employed in the electrolyte.

Generally speaking, the organometallic compound is also present in the electrolyte to ensure that it incorporates into the dielectric during anodic oxidation. The organometallic compound is typically present in an amount of from about 0.1 to about 20 wt. %, in some embodiments from about 0.5 to about 10 wt. %, and in some embodiments, from about 1 to about 5 wt. % of the electrolyte. Of course, it should be understood that other techniques may also be employed for incorporating the organometallic compound into the dielectric layer. For example, the organometallic compound may simply be mixed with the electrically conductive particles used in the anode, than reduce prior to formation of the dielectric layer. Alternatively, the organometallic compound may be mixed with a starting material (e.g., $Nb_2O_5$) that is subsequently reacted to form electrically conductive particles (e.g., NbO). Regardless of the particular technique employed, doping with the organometallic compound normally results in the presence of a metallic element (e.g., silicon, titanium, etc.) in the dielectric layer in an amount of about 100 parts per million ("ppm") or more, in some embodiments about 200 ppm to about 500,000 ppm, in some embodiments about 400 ppm to about 100,000 ppm, and in some embodiments, from about 600 ppm to about 50,000 ppm.

A current is passed through the electrolyte to form the dielectric layer. The value of voltage manages the passed charge (current multiplied by time) and thereby the thickness of the dielectric layer. For example, the power supply may be initially set up at a galvanostatic mode until the required voltage is reached. Thereafter, the power supply may be switched to a potentiostatic mode to ensure that the desired dielectric thickness is formed over the surface of the anode. Of course, other known methods may also be employed, such as pulse methods. The voltage typically ranges from about 4 to about 200 V, and in some embodiments, from about 9 to about 100 V. During anodic oxidation, the electrolyte can be kept at an elevated temperature, such as about 30° C. or more, in some embodiments from about 40° C. to about 200° C., and in some embodiments, from about 50° C. to about 100° C. Anodic oxidation can also be done at ambient temperature or lower. The resulting dielectric layer may be synthesized on a surface of the anode and/or within its pores.

Once the dielectric layer is formed, a protective coating may optionally be applied, such as one made of a relatively insulative resinous material (natural or synthetic). Such materials may have a specific resistivity of greater than about 0.05 ohm-cm, in some embodiments greater than about 5, in some embodiments greater than about 1,000 ohm-cm, in some embodiments greater than about $1 \times 10^5$ ohm-cm, and in some embodiments, greater than about $1 \times 10^{10}$ ohm-cm. Some resinous materials that may be utilized in the present invention include, but are not limited to, polyurethane, polystyrene, esters of unsaturated or saturated fatty acids (e.g., glycerides), and so forth. For instance, suitable esters of fatty acids include, but are not limited to, esters of lauric acid, myristic acid, palmitic acid, stearic acid, eleostearic acid, oleic acid, linoleic acid, linolenic acid, aleuritic acid, shellolic acid, and so forth. These esters of fatty acids have been found particularly useful when used in relatively complex combinations to form a "drying oil", which allows the resulting film to rapidly polymerize into a stable layer. Such drying oils may include mono-, di-, and/or tri-glycerides, which have a glycerol backbone with one, two, and three, respectively, fatty acyl residues that are esterified. For instance, some suitable drying oils that may be used include, but are not limited to, olive oil, linseed oil, castor oil, tung oil, soybean oil, and shellac. These and other protective coating materials are described in more detail U.S. Pat. No. 6,674,635 to Fife, et al., which is incorporated herein in its entirety by reference thereto for all purposes.

The anodized part is thereafter subjected to a step for forming cathodes according to conventional techniques. In some embodiments, for example, the cathode is formed by various techniques, such as pyrolytic decomposition of manganese nitrate ($Mn(NO_3)_2$) to form a manganese dioxide ($MnO_2$) cathode. Such techniques are described, for instance, in U.S. Pat. No. 4,945,452 to Sturmer, et al., which is incorporated herein in its entirety by reference thereto for all purposes. Alternatively, a conductive polymer coating may be used to form the cathode of the capacitor. The conductive polymer coating may contain one or more polyheterocycles (e.g., polypyrroles; polythiophenes, poly(3,4-ethylenedioxythiophene) (PEDT); polyanilines); polyacetylenes; poly-p-phenylenes; polyphenolates; and derivatives thereof. Moreover, if desired, the conductive polymer coating may also be formed from multiple conductive polymer layers. For example, in one embodiment, the conductive polymer coating may contain one layer formed from PEDT and another layer formed from a polypyrrole. Various methods may be utilized to apply the conductive polymer coating onto the anode part. For instance, conventional techniques such as electropolymerization, screen-printing, dipping, electrophoretic coating, and spraying, may be used to form a conductive polymer coating. In one embodiment, for example, the monomer(s) used to form the conductive polymer (e.g., 3,4-ethylenedioxythiophene) may initially be mixed with a polymerization catalyst to form a solution. For example, one suitable polymerization catalyst is BAYTRON C, which is iron III toluenesulfonate and sold by H. C. Starck. BAYTRON C is a commercially available catalyst for BAYTRON M, which is 3,4-ethylenedioxythiophene, a PEDT monomer also sold by H. C. Starck. Once a catalyst dispersion is formed, the anode part may then be dipped into the dispersion so that the polymer forms on the surface of the anode part. Alternatively, the catalyst and monomer(s) may also be applied separately to the anode part. In one embodiment, for example, the catalyst may be dissolved in a solvent (e.g., butanol) and then applied to the anode part as a dipping solution. The anode part may then be dried to remove the solvent therefrom. Thereafter, the anode part may be dipped into a solution containing the appropriate monomer. Once the monomer contacts the surface of the anode part containing the catalyst, it chemically polymerizes thereon. In addition, the catalyst (e.g., BAYTRON C) may also be mixed with the material(s) used to form the optional protective coating (e.g., resinous materials). In such instances, the anode part may then be dipped into a solution containing the monomer (BAYTRON M). As a result, the monomer can contact the catalyst within and/or on the surface of the protective coating and react therewith to form the conductive polymer coating. Although various methods have been described above, it should be understood that any other method for applying the conductive coating(s) to the anode part may also be utilized in the present invention. For example, other methods for applying such conductive polymer coating(s) may be described in U.S. Pat. No. 5,457, 862 to Sakata, et al., U.S. Pat. No. 5,473,503 to Sakata, et al., U.S. Pat. No. 5,729,428 to Sakata, et al., and U.S. Pat. No. 5,812,367 to Kudoh, et al., which are incorporated herein in their entirety by reference thereto for all purposes.

In most embodiments, once applied, the conductive polymer is healed. Healing may occur after each application of a conductive polymer layer or may occur after the application of the entire conductive polymer coating. In some embodiments, for example, the conductive polymer may be healed by dipping the pellet into an electrolyte solution, such as a solution of phosphoric acid and/or sulfuric acid, and thereafter applying a constant voltage to the solution until the current is reduced to a preselected level. If desired, such healing may be accomplished in multiple steps. For instance, in one embodiment, a pellet having a conductive polymer coating is first dipped in phosphoric acid and applied with about 20 Volts and then dipped in sulfuric acid and applied with about 2 Volts. In this embodiment, the use of the second low voltage sulfuric acid solution or toluenesulfonic acid can help increase capacitance and reduce the dissipation factor (DF) of the resulting capacitor. After application of some or all of the layers described above, the pellet may then be washed if desired to remove various byproducts, excess catalysts, and so forth. Further, in some instances, drying may be utilized after some or all of the dipping operations described above. For example, drying may be desired after applying the catalyst and/or after washing the pellet in order to open the pores of the pellet so that it can receive a liquid during subsequent dipping steps.

Once the cathode is formed, the part may optionally be applied with a carbon layer (e.g., graphite) and silver layer, respectively. The silver coating may, for instance, act as a solderable conductor, contact layer, and/or charge collector for the capacitor element and the carbon coating may limit contact of the silver coating with the solid electrolyte. Such coatings may cover some or all of the solid electrolyte.

Figure 2:
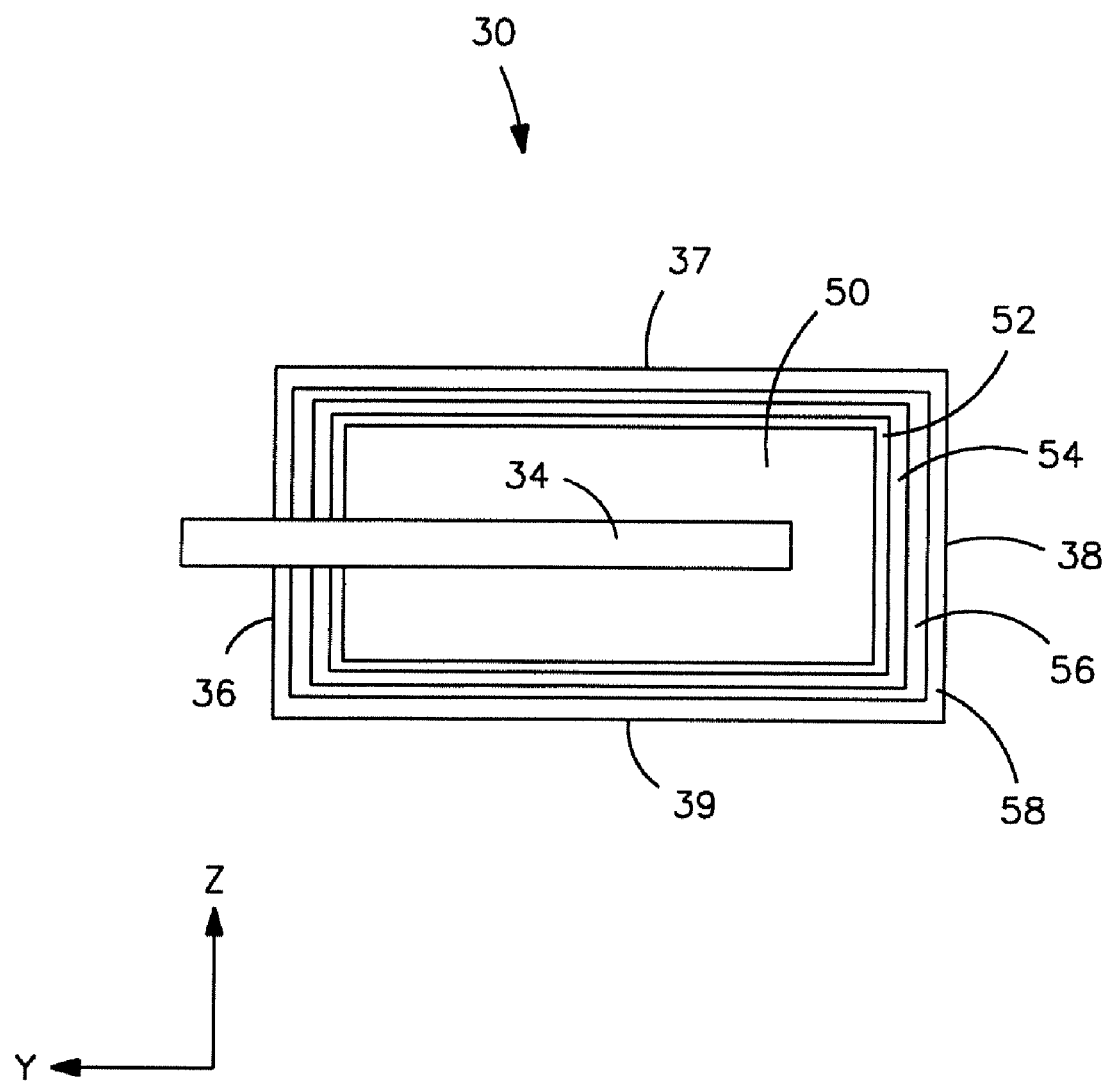
FIG. 2 is a cross-sectional view of the capacitor of FIG. 1.

The resulting capacitor element may then be terminated using techniques known in the art. Referring to FIGS. 1-2, for example, one embodiment of a capacitor element 30 is shown that has a generally rectangular shape and contains a front surface 36, rear surface 38, top and bottom surfaces 37 and 39, respectively, and side surfaces 32 (only one of which is illustrated). An anode wire 34 extends from the front surface 36 of the capacitor element 30 in a longitudinal direction ("y" direction). As further shown in FIG. 2, the capacitor element 30 contains an anode body 50, a dielectric layer 52 overlying the anode body 50, a solid electrolyte layer 54 overlying the dielectric layer 52, a graphite layer 56 overlying the organic solid electrolyte layer 54, and a silver layer 58 overlying the graphite layer 56. Of course, it should be understood that such layers may be applied to any surface of the capacitor, and need not be applied in the manner illustrated.

Figure 3:
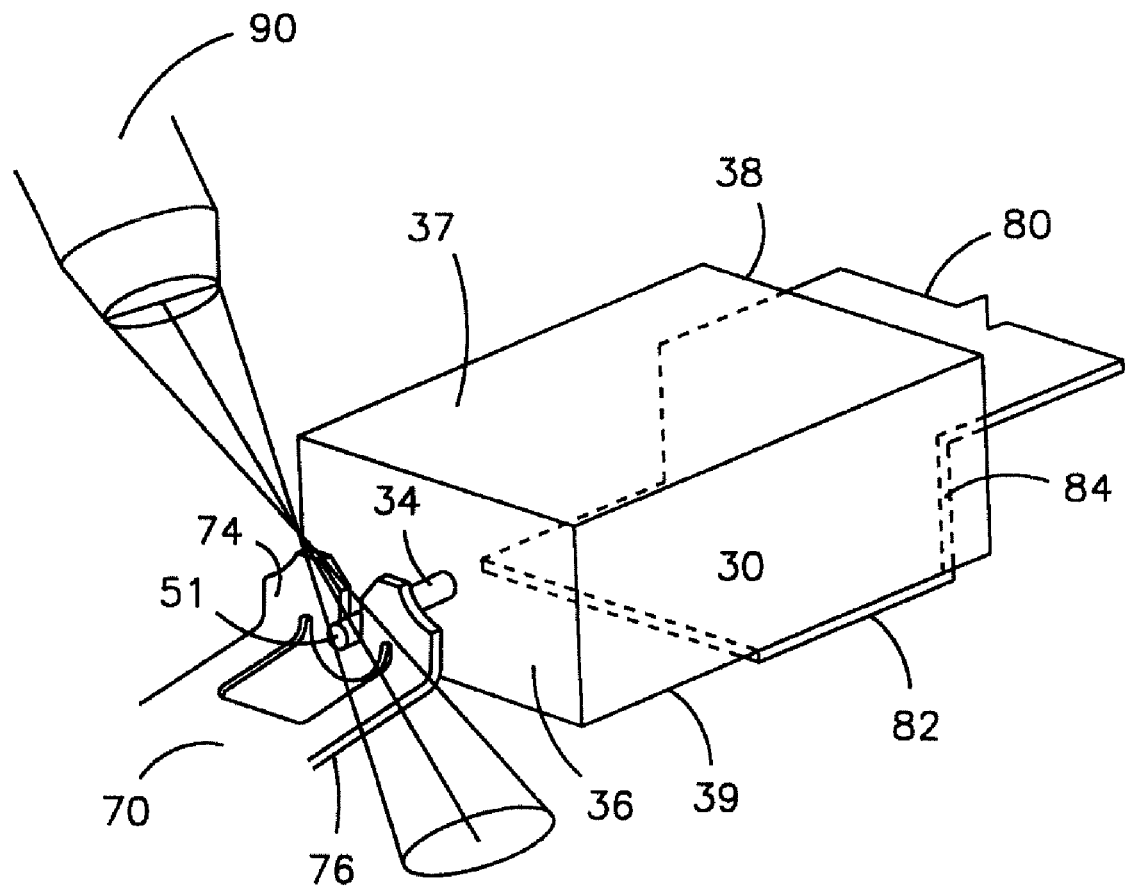
FIG. 3 is a schematic illustration of one embodiment of the present invention for laser welding a capacitor to an anode termination.

Upon formation of the capacitor element 30, anode and cathode termination may be electrically connected to the anode wire 34 and the solid electrolyte layer 54 (via the graphite and silver layers), respectively. The specific configuration of the terminations may vary as is well known in the art. Referring to FIG. 3, for example, one embodiment is shown that includes an anode termination 70 and a cathode termination 80. In this particular embodiment, the cathode termination contains a first portion 82 positioned substantially perpendicular to a second portion 84. The first portion 82 is in electrical contact with the lower surface 39 of the capacitor element 30 and the second portion 84 is in electrical contact with the rear surface 38 of the capacitor element 30. To attach the capacitor element 30 to the cathode termination 80, a conductive adhesive may be employed as is known in the art. The conductive adhesive may include, for instance, conductive metal particles contained with a resin composition. The metal particles may be silver, copper, gold, platinum, nickel, zinc, bismuth, etc. The resin composition may include a thermoset resin (e.g., epoxy resin), curing agent (e.g., acid anhydride), and coupling agent (e.g., silane coupling agents). Suitable conductive adhesives are described in U.S. Patent Application Publication No. 2006/0038304 to Osako, et al., which is incorporated herein in its entirety by reference thereto for all purposes.

Figure 4:
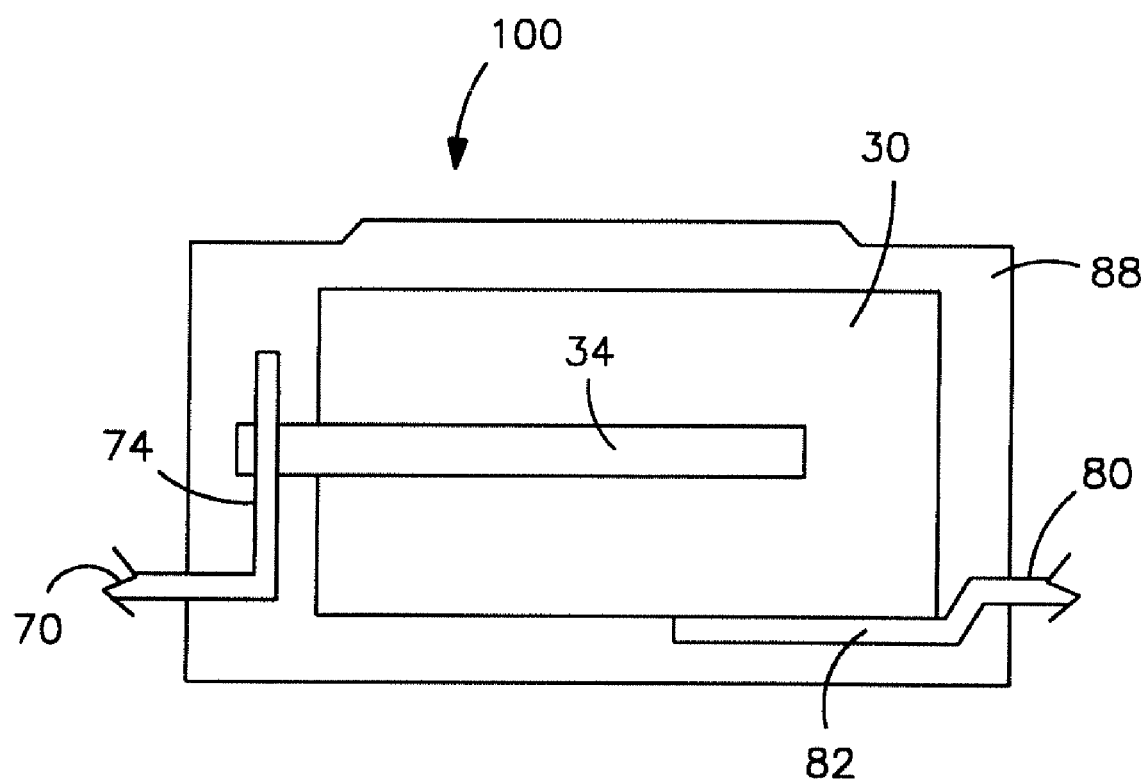
FIG. 4 is a cross-sectional view of a laser welded capacitor formed in accordance with one embodiment of the present invention.

The anode termination 70 contains a first portion 76 positioned substantially perpendicular to a second portion 74. The second portion 74 contains a region that carries the anode wire 34. In the illustrated embodiment, the region 51 possesses a "U-shape" for further enhancing surface contact and mechanical stability of the wire 34. The anode wire 34 is then welded to the region 51 with a laser 90. Once the capacitor element is attached to the terminations, it is enclosed within a resin casing, which may then be filled with silica-containing resin or any other known encapsulating material. The width and length of the case may vary depending on the intended application. However, the overall thickness of the casing is typically small so that the resultant assembly may be readily incorporated into low profile products (e.g., "IC cards"). For example, the thickness of the casing may range from about 4.0 millimeters or less, in some embodiments, from about 0.1 to about 2.5 millimeters, and in some embodiments, from about 0.15 to about 2.0 millimeters. Suitable casings may include, for instance, "A", "B", "H", or "T" cases (AVX Corporation). Referring to FIG. 4, for example, one particular embodiment of such an encapsulating case for a capacitor assembly 100 is shown as element 88. The encapsulating case 88 provides additional structural and thermal protection for the capacitor assembly 100. After encapsulation, exposed portions of the respective anode and cathode terminations may be aged, screened, and trimmed. If desired, the exposed portions may be optionally bent twice along the outside of the casing 88 (e.g., at an approximately 90° angle).

As a result of the present invention, a capacitor may be formed that exhibits excellent electrical properties. For example, the capacitor of the present invention typically has an ESR less than about 1000 milliohms (mohms), in some embodiments less than about 500 mohms, and in some embodiments, less than about 100 mohms. The equivalent series resistance of a capacitor generally refers to the extent that the capacitor acts like a resistor when charging and discharging in an electronic circuit and is usually expressed as a resistance in series with the capacitor. In addition, the resulting leakage current, which generally refers to the current flowing from one conductor to an adjacent conductor through an insulator, can be maintained at relatively low levels. For example, the numerical value of the normalized leakage current of a capacitor of the present invention is, in some embodiments, less than about 0.1 µA/µF*V, in some embodiments less than about 0.01 µA/µF*V, and in some embodiments, less than about 0.001 µA/µF*V, wherein µA is microamps and uF*V is the product of the capacitance and the rated voltage. Likewise, the breakdown voltage of the capacitor of the present invention may be at least about 10 volts, in some embodiments at least about 15 volts, in some embodiments at least about 20 volts, and in some embodiments, from about 20 volts to about 100 volts.

The present invention may be better understood by reference to the following examples.

Test Procedures

VA Characteristics

The V-A characteristics of a capacitor were measured with a series resistance 100 mOhms. The applied voltage was gradually increased by a bipolar power supply (Keithley 2400) in increments of 0.1 V and the current was measured by a digital multimeter (Agilent 34401) at a temperature of 25° C. after 10 s delay.

EXAMPLE 1

Figure 5:
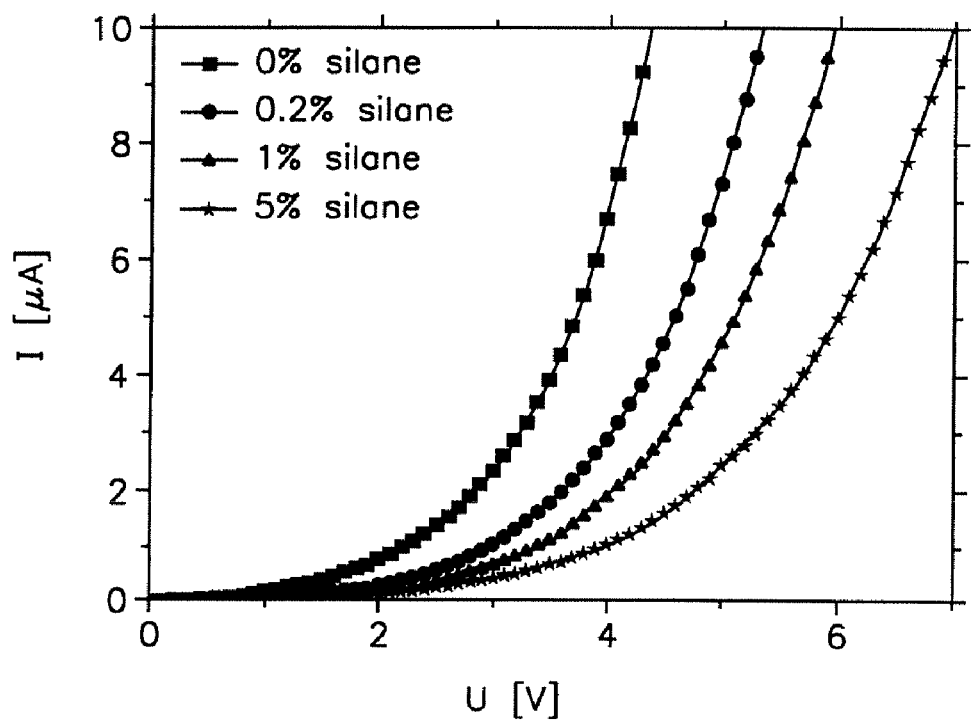
FIG. 5 is a graphical depiction of the V-A results obtained in Example 1.

80,000 µFV/g niobium oxide powder (HC Starck) was pressed into pellets and sintered to form a porous electrode body. Anodic oxidation was then carried out in an aqueous solution containing phosphoric acid and varying concentrations of N-2-(aminoethyl)3-aminopropylmethyldimethoxysilane (0%, 0.2%, 1%, and 5%) at ambient temperature. The anodic oxidation was done first galvanostatically to the desired voltage and than potentiostatically. The conductivity of the electrolyte with supporting electrolyte was 4.5 mS/cm. The voltage was chosen to obtain a targeted capacitance of 100 µF. After anodic oxidation, the pellets were coated with a manganese dioxide layer, a graphite coating and a silver coating. The finished parts were completed by conventional assembly technology to the B case (EIA 3528). The V-A characteristics of a capacitor were then measured. The results are shown in FIG. 5.

EXAMPLE 2

Figure 6:
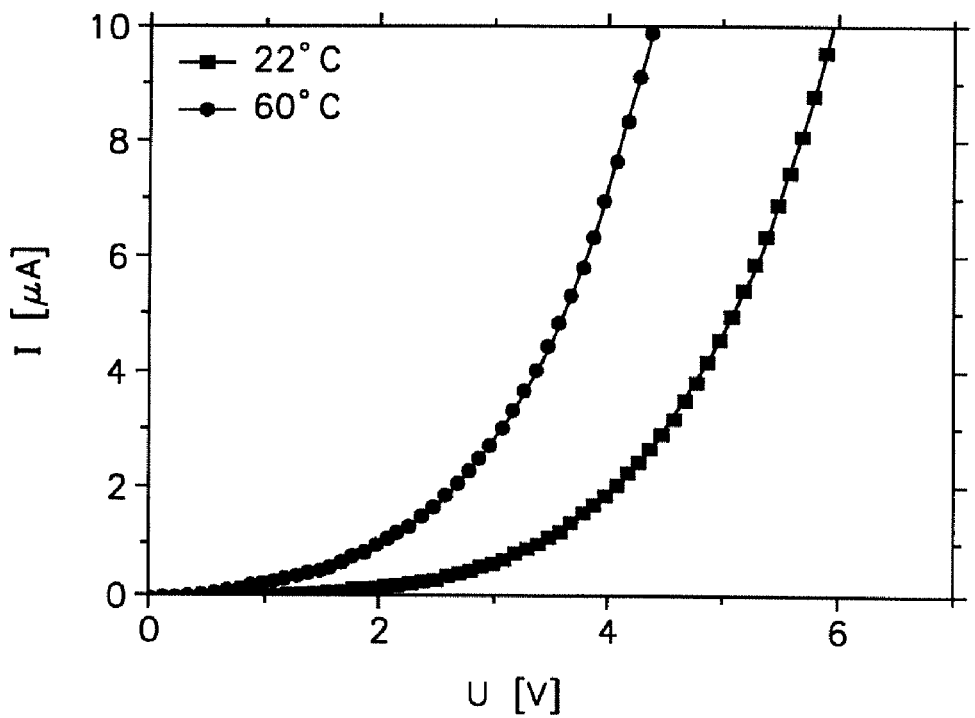
FIG. 6 is a graphical depiction of the V-A results obtained in Example 2.

Anode pellets were formed as described in Example 1, except that anodic oxidation occurred in an aqueous solution that contained 1% N-2-(aminoethyl)3-aminopropylmethyidimethoxysilane at temperatures of 22° C. and 60° C. The V-A characteristics are shown in FIG. 6.

EXAMPLE 3

Figure 7:
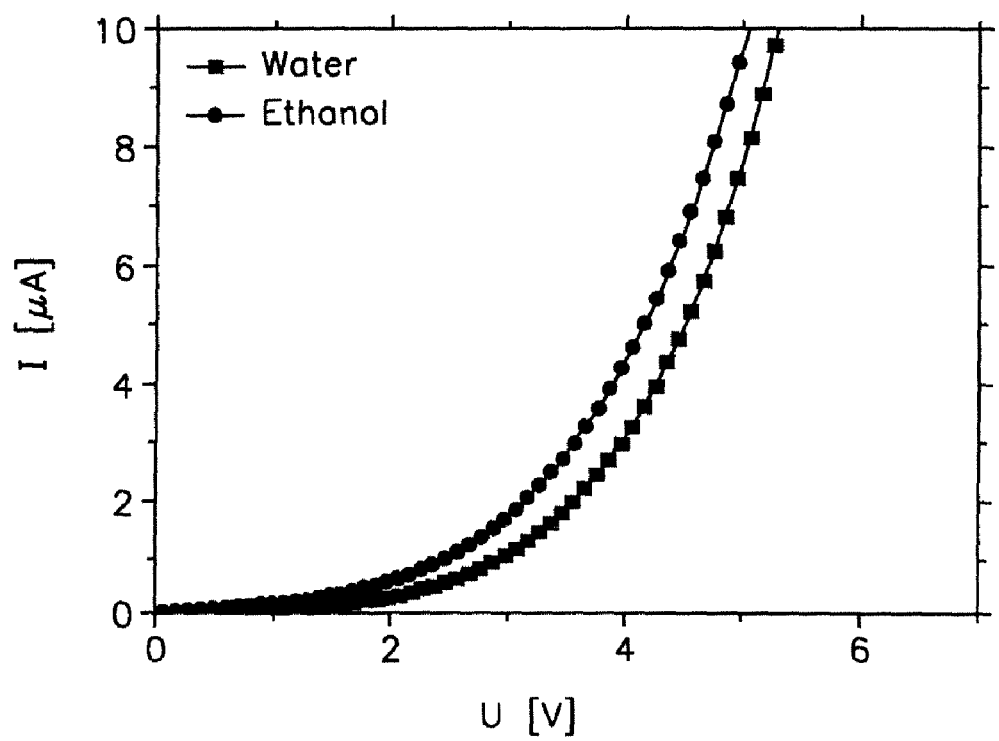
FIG. 7 is a graphical depiction of the V-A results obtained in Example 3.

Anode pellets were formed as described in Example 1, except that anodic oxidation occurred in a solution containing water and ethanol solvents and 1% N-2-(aminoethyl)3-aminopropylmethyldimethoxysilane. The V-A characteristics are shown in FIG. 7.

EXAMPLE 4

Figure 8:
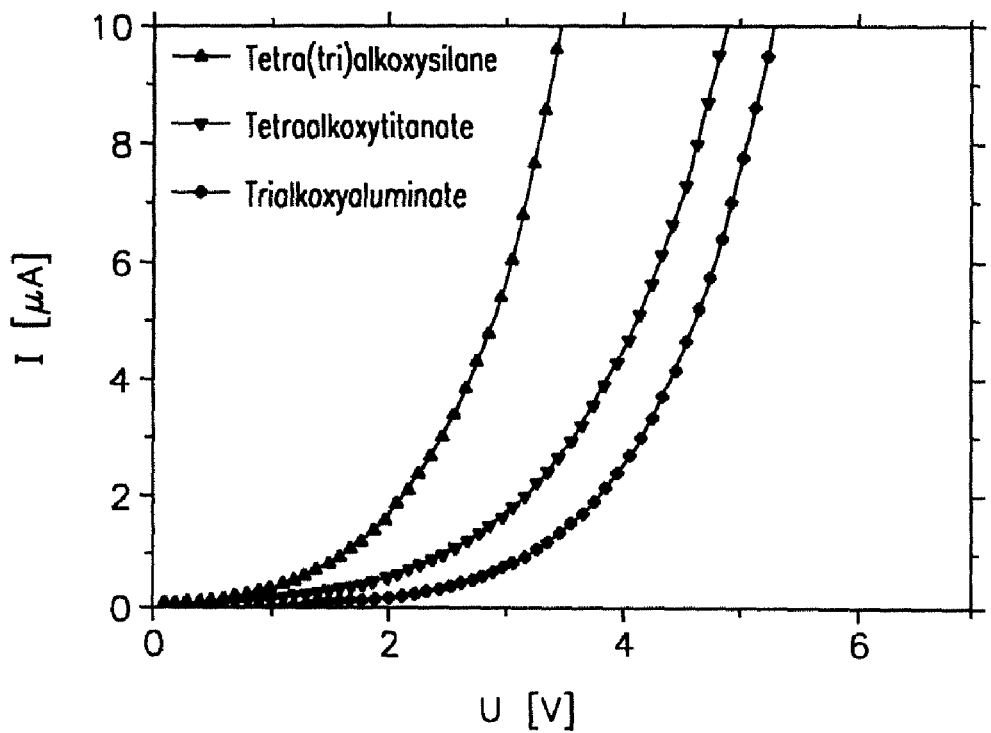
FIG. 8 is a graphical depiction of the V-A results obtained in Example 4.

Anode pellets were formed as described in Example 1, except that anodic oxidation occurred in a solution containing phosphoric acid and 1% of either tetra(tri)alkoxysilane, tetralkoxytitanate, or trialkoxyaluminate in butanol. The V-A characteristics are shown in FIG. 8.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A method for forming a capacitor anode, the method comprising:
    forming an anode body that comprises a valve metal composition; and
    anodically oxidizing the anode body in the presence of an electrolyte to form a dielectric layer, wherein the electrolyte comprises an organometallic compound in an amount of from about 0.1 wt. % to about 20 wt. %.

2. The method of claim 1, wherein the organometallic compound contains at least one reactive functional group bonded to a metal atom.

3. The method of claim 2, wherein the metal atom is silicon, titanium, aluminum, vanadium, niobium, manganese, magnesium, or a combination thereof.

4. The method of claim 1, wherein the organometallic compound includes an organosilane.

5. The method of claim 4, wherein the organosilane is an alkoxysilane.

6. The method of claim 5, wherein the alkoxysilane is an epoxyalkoxysilane.

7. The method of claim 1, wherein the organometallic compound constitutes from about 0.5 to about 10 wt. % of the electrolyte.

8. The method of claim 1, wherein the electrolyte further contains an acid.

9. The method of claim 1, wherein the anode body is formed by compacting a powder to form a pressed pellet and sintering the pressed pellet.

10. The method of claim 1, wherein the anode body is dipped into the electrolyte.

11. The method of claim 1, wherein the valve metal composition contains tantalum, niobium, or an electrically conductive oxide thereof.

12. The method of claim 1, wherein the valve metal composition contains an oxide of niobium having an atomic ratio of niobium to oxygen of 1:1.0 ±0.3.

13. The method of claim 1, wherein the valve metal composition contains an oxide of niobium having an atomic ratio of niobium to oxygen of 1:1.0 ±0.1.

14. A capacitor anode formed according to the method of claim 1.

15. An electrolytic capacitor comprising the capacitor anode of claim 14, further comprising an electrolyte layer overlying the dielectric layer.

16. An electrolytic capacitor comprising:
    an anode body containing tantalum, niobium, or an electrically conductive oxide thereof;
    a dielectric layer overlying the anode body, the dielectric layer containing a metallic element derived from an organometallic compound, the metallic element including silicon; and
    an electrolyte layer overlying the dielectric layer.

17. The electrolytic capacitor of claim 16, wherein the metallic element constitutes about 100 parts per million or more of the dielectric layer.

18. The electrolytic capacitor of claim 16, wherein the metallic element constitutes about 200 to about 500,000 parts per million of the dielectric layer.

19. The electrolytic capacitor of claim 16, wherein the anode body contains an oxide of niobium having an atomic ratio of niobium to oxygen of 1:1.0 ±0.3.

20. The electrolytic capacitor of claim 16, wherein the anode body contains an oxide of niobium having an atomic ratio of niobium to oxygen of 1:1.0 ±0.1.

21. The electrolytic capacitor of claim 16, further comprising at least an additional layer that overlies the electrolyte layer, the additional layer including a carbon layer, silver layer, or a combination thereof.

22. The electrolytic capacitor of claim 16, further comprising an anode lead that extends from the anode body.

23. The electrolytic capacitor of claim 22, further comprising:
    a cathode termination that is in electrical communication with the electrolyte layer;
    an anode termination that is in electrical communication with the anode body;
    and
    a case that encapsulates the capacitor and leaves at least a portion of the anode and cathode terminations exposed.

24. The electrolytic capacitor of claim 16, wherein the electrolyte layer contains a conductive polymer.

25. The electrolytic capacitor of claim 16, wherein the electrolyte layer contains manganese dioxide.

* * * * *